United States Patent
Yassin

(12)
(10) Patent No.: US 6,287,466 B1
(45) Date of Patent: Sep. 11, 2001

(54) SWIMMING POOL WATER INLET POOL CHLORINATOR

(76) Inventor: Ihassan F. Yassin, 1154 Acadia Pl., Ventura, CA (US) 93003

( * ) Notice: Subject to any disclaimer, the term of this patent is extended or adjusted under 35 U.S.C. 154(b) by 0 days.

(21) Appl. No.: 09/636,685

(22) Filed: Aug. 11, 2000

(51) Int. Cl.$^7$ .................................. C02F 1/50; C02F 1/76; E04H 4/16
(52) U.S. Cl. ...................... 210/198.1; 210/169; 137/268; 422/264
(58) Field of Search ................................. 210/198.1, 169; 137/268; 422/264

(56) References Cited

U.S. PATENT DOCUMENTS

| | | | |
|---|---|---|---|
| 3,129,172 | * | 4/1964 | Dickey, Jr. et al. . |
| 4,140,634 | * | 2/1979 | Harry . |
| 4,662,387 | * | 5/1987 | King, Sr. . |
| 5,076,315 | * | 12/1991 | King . |
| 5,225,074 | * | 7/1993 | Moini . |
| 5,743,287 | * | 4/1998 | Rauchwerger . |
| 5,932,093 | * | 8/1999 | Chulick . |
| 6,065,690 | * | 5/2000 | O'Brien . |
| 6,162,407 | * | 12/2000 | Pihl . |
| 6,221,244 | * | 4/2001 | Yassin . |

* cited by examiner

Primary Examiner—Thomas M. Lithgow
(74) Attorney, Agent, or Firm—Jack C. Munro

(57) ABSTRACT

A pool chlorinator connectable to a water inlet conduit of a swimming pool having a housing with a supply conduit and outlet conduit. The supply conduit terminates with a flexible connector which is adapted to press tightly against the wall surface of the swimming pool and suction cups are employed to mount the housing to the wall of the swimming pool.

5 Claims, 2 Drawing Sheets

SWIMMING POOL WATER INLET POOL CHLORINATOR

BACKGROUND OF THE INVENTION

1) Field of the Invention

The subject matter of this invention pertains to a device for introducing a chemical into a pool of liquid and more particularly to a chlorinator for a swimming pool.

2) Description of the Prior Art

In order to keep a swimming pool sanitary and to keep algae from growing within the swimming pool, it is necessary to add chlorine on a regular basis to the swimming pool water. The vast majority of swimming pool chlorinators are designed to supply chlorine on an automatic basis by adding chlorine over a period of time. One way in which chlorine can be added over a period of time is by utilizing of a tablet that is designed to dissolve at a certain rate. Normally, these tablets take a period of days in order to be completely dissolved.

There are several different types of chlorinators that uses dissolving tablets. One particular type of chlorinator comprises a floating chlorinator where the dispenser floats around the swimming pool with the tablet or tablets contained within the dispenser and with the dissolving of the tablet to chlorinate the water of the swimming pool. However, one problem with the floating dispenser that it commonly moves to one particular location in the swimming pool and stays in that location. The result is that the chlorine concentration within the swimming pool near the chlorinator is substantially greater than other regions of the pool. Commonly, a floating dispenser type of chlorinator is used as a secondary form of chlorinator with the primary form of chlorinator comprising another type of chlorinator that works in conjunction with the water circulation system of the swimming pool.

A common form of primary chlorinator is one that is integrated in conjunction with the water circulation system of the swimming pool. This type of chlorinator provides for injecting of controlled amounts of chlorinating chemicals into the circulating water has intended to achieve a uniform distribution of chlorine throughout the pool. Chemicals are often solid tablets or sticks of chlorine containing salts. This type of chlorinator causes the recirculating water to flow over the tablets or the sticks with the tablets or sticks to gradually dissolve. The chlorine concentration can be regulated by controlling the flow rate of the circulating water past the sticks or tablets. One of the disadvantages of this type of chlorinator is that it has to be mounted in conjunction with the water circulation system of the swimming pool. Another disadvantage of this type of chlorinator is that even chlorination throughout the swimming pool is almost never achieved. There always seems to be at least one area of the swimming pool that is not receiving an adequate amount of chlorine.

SUMMARY OF THE INVENTION

The primary objective of the present invention is to construct a chlorinator that can be substituted for a chlorinator that is connected to the water circulation system of a swimming pool.

Another objective of the present invention is to construct a chlorinator that can be quickly and easily mounted in conjunction with a swimming pool not requiring any modification of the swimming pool structure or the swimming pool equipment.

Another objective of the present invention is to construct a chlorinator that works in conjunction with the water inlet conduit of a swimming pool that is not fixedly mounted in relation to the water inlet conduit.

Another objective of the present invention is to construct a chlorinator where a separate chlorinator can be mounted in conjunction with each water inlet conduit of a swimming pool with the result that there is several different chlorinators used within a swimming pool to achieve even distribution of chlorine throughout the swimming pool.

Another objective of the present invention is to construct a chlorinator that can be easily regulated to vary the amount of chlorine that is being dissolved within the swimming pool water and also can be easily manipulated so as to vary the direction of flow of the water so the water can be directed to an area of the swimming pool that contains a low chlorine content.

Another objective of the present invention is to construct a chlorinator that can be manufactured at a relatively inexpensive price and therefore sold to the ultimate consumer at an inexpensive price.

The chlorinator of the present invention comprises a housing which is generally cylindrical in configuration and has an exterior surface on which is mounted at least one suction cup. Connected with the housing is an inlet conduit and an outlet conduit. A chlorine tablet is to be contained within the housing. The inlet conduit terminates at a flexible connector. The suction cup is to be mounted onto the wall surface of the swimming pool with the flexible connector surrounding the water inlet conduit When the suction cup is pressed tightly against the wall surface of the swimming pool, the flexible connector deflects and compresses forming a relatively tight contact also with the wall surface of the swimming pool. The housing includes a valve, and this valve can be adjusted so that the bulk of the water is conducted through the housing and into the outlet conduit (minimum level) with only a minimal contact with the chlorine tablet or can be adjusted so that all the water that is conducted through the housing is conducted into contact with chlorine tablet prior to exiting the outlet conduit (maximum level). Also, the valve can vary the amount of the water between the previously mentioned minimum and maximum levels. The conduit can be adjusted to vary the direction of the flow from the outlet conduit so the chlorinated water can be directed to different areas of the swimming pool and to an area of the swimming pool that is low in dissolved chlorine. A lanyard is connected to the suction cup at the exterior surface of the surface cup with the outer end of the lanyard being connected to a float ring which is to float on the surface of the water of a swimming pool. Grasping of the float ring and yanking therein will cause the suction cup to disengage from the wall surface and effect removal of the chlorinator when such is desired from the swimming pool.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE PREFERRED EMBODIMENT

Figure 1:
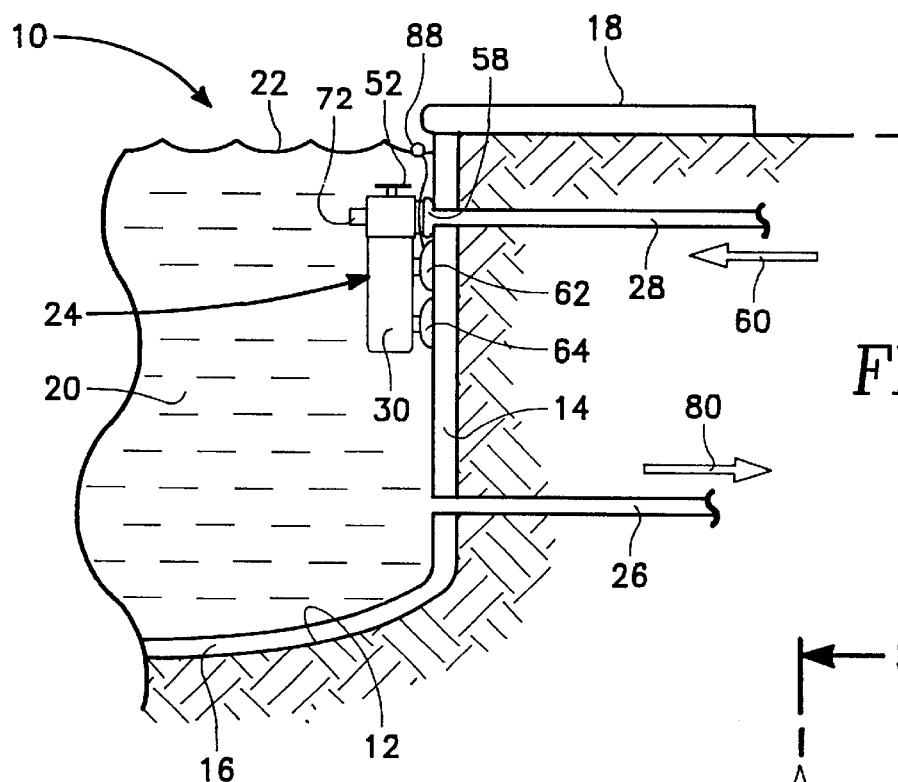
FIG. 1 is a schematic cross-sectional view depicting usage of the chlorinator of the present invention in conjunction with a swimming pool.

Referring particularly to the drawing, there is shown in FIG. 1 a swimming pool 10 that is formed within a cavity 12 within the ground. The swimming pool 10 has a wall surface 14 and a floor 16. Surrounding the swimming pool 10 is a coping 18. The swimming pool 10 is to be filled with water 20 which has a surface 22. The chlorinator 24 is to be installed on the wall surface 14 beneath the surface 22. The swimming pool 10 also includes a water outlet conduit 26 and a water inlet conduit 28. It is to be understood that the conduits 26 and 28 connect with appropriate swimming pool filtering and heating equipment, which is not shown in the drawing.

Chlorinator 24 comprises a cylindrically shaped housing 30. The housing 30 is generally constructed of thin walled sheet material generally of plastic. It includes a bottom 32 and a top 34. The bottom 32 has a series of protrusions 36 which are located within the internal chamber 38 of the housing 30. A chlorine tablet 40 is to be placed on the protrusions 36. It is the function of the protrusions 36 is to maximize the surface area of the chlorine tablet that will come into contact with the water that is contained within the internal chamber 38. This will maximize the dissolving rate of the chlorine tablet 40.

It is to be understood that access into internal chamber 38 will be necessary for the insertion of the chlorine tablet 40. The housing 30 could be constructed of two parts (not shown) that would be connectable as by screw threads. Also, the top 34 could be separable from the housing 30 (not shown) by turning of the top 34 relative to the housing 30 with there being some form of locking detent arrangement therebetween.

Figure 3:
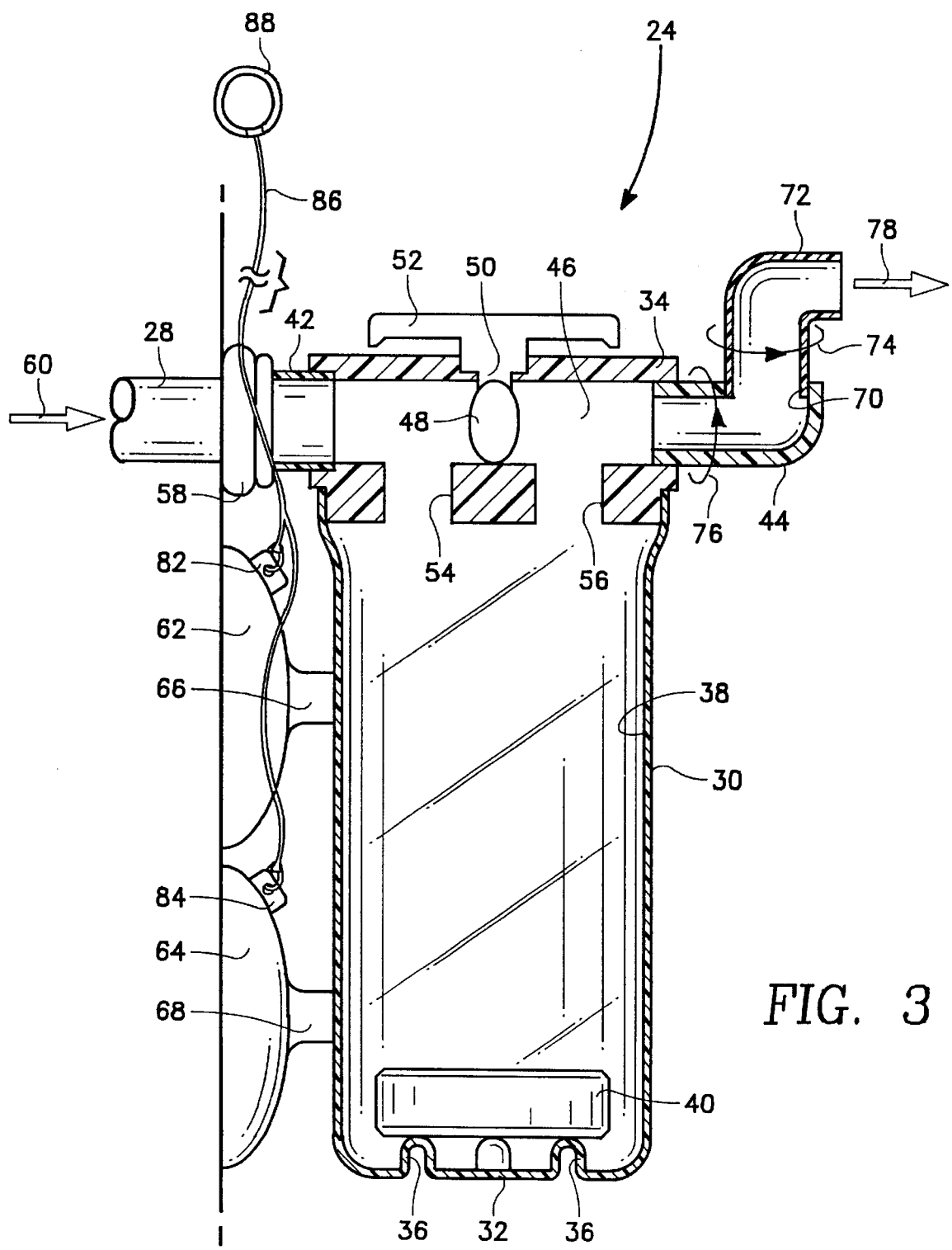
FIG. 3 is a cross-sectional view taken along line 3—3 of FIG. 2.

Mounted in conjunction with the housing 30 directly adjacent the top 34 is an inlet conduit 42 and an outlet conduit 44. Contained within the housing is a passage 46. The passage 46 is located directly adjacent the top 34. The flow through the inlet conduit 42 is capable of being substantially conducted straight through the passage 46 to the outlet conduit 44. Mounted in conjunction with the passage 46 is a valve plate 48. The valve plate 48 is mounted on a connecting rod 50 which is conducted through the top 34 and connects to a handle 52. Manual turning of the handle 52 can cause the valve plate 48 to either be located crosswise within the passage 46 which would require that all flow through the passage 46 to be conducted through opening 54 into the main body of the internal chamber 38 and then through opening 56 back into the passage 46 bypassing the valve plate 48. This bypassing of the valve plate 46 causes the water to be forced into contact with the chlorine tablet 40 prior to exiting through the outlet conduit 44. However, if the valve plate 48 is adjusted so as to be longitudinally oriented within the passage 46, substantially all of the water that is being conducted through the inlet conduit 42 would merely pass straight through to the outlet pipe 44 with only a minimum amount of water being forced down into the main portion of the internal chamber 38 and hence in contact with the chlorine tablet 40. With the valve plate 48 in the closed position within the passage 46, the maximum dissolving rate of the chlorine tablet is achieved within the water that is being discharged through the outlet conduit 44. However, if the valve plate 48 is in the longitudinally oriented position, which is shown in FIG. 3, only a minimal amount of chlorine from the chlorine tablet 40 is being dissolved into the water prior to being discharged through the outlet conduit 44. Actually, it would probably be normal practice to have the valve plate 48 occupy some intermediate position between the maximum and the minimum chlorine dissolving rates. It is to be understood that the valve plate 48, connecting rod 50 and handle 52 comprise a manually operated valve assembly. It is to be understood that even with the valve plate 48 in the longitudinally oriented position, there will always be a small amount of water flowing into and out of the internal chamber 38 through the openings 54 and 56 so that there will always be some amount of chlorine dissolved from the chlorine tablet 40 that is being discharged in the water through the outlet conduit 44.

The inlet conduit 42 includes a flexible connector 58 mounted at its outer end. A typical material of construction of the flexible connector 58 would be a rubber or a plastic material. The flexible connector is larger in diameter than the water inlet conduit 28 through which water is to flow in the direction of arrow 60. Fixedly mounted on the exterior surface of the housing 30 are a pair of suction cups 62 and 64. Suction cup 62 is mounted by connector 66 to the housing 30. Suction cup 64 is fixedly mounted by connector 68 to the housing 30.

Fixedly mounting of the chlorinator 24 onto the wall surface 14 causes the suction cups 62 and 64 to be squished assuming a somewhat flattened configuration. Simultaneously, the flexible connector 58 will be pressed tightly and be squished (deflected) against the wall surface in essence forming a substantially watertight connection with the water outlet conduit 28. This will result in substantially all the water flowing from the water outlet conduit 28 directly into the passage 46.

Figure 2:
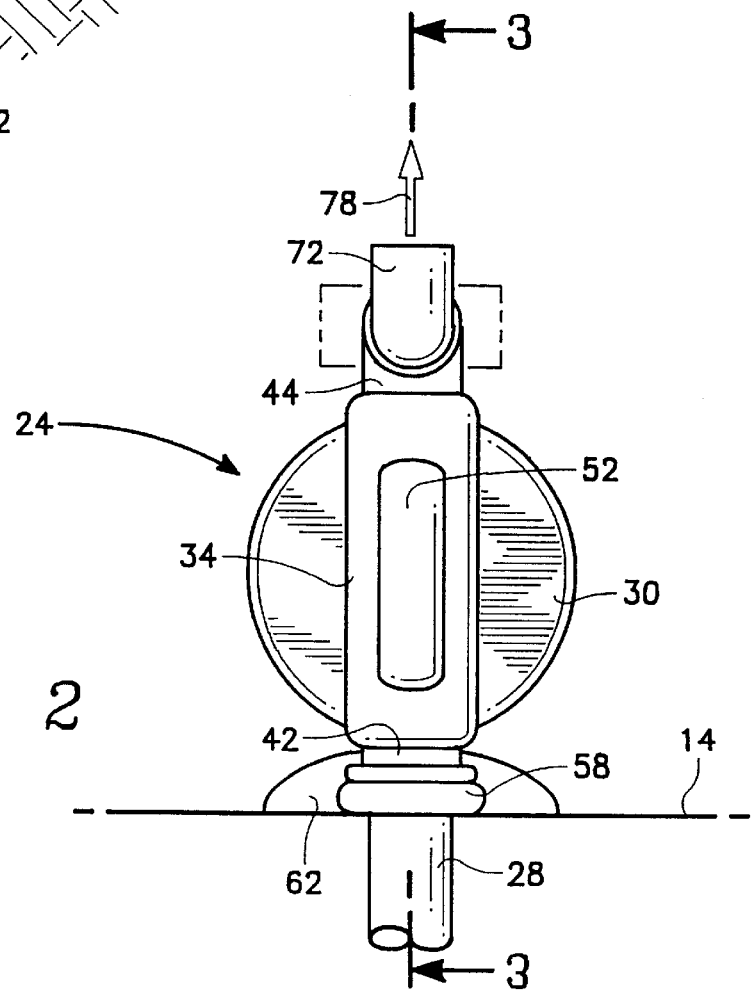
FIG. 2 is a top plan view of the chlorinator of the present invention showing it in position mounted on the wall surface of the swimming pool.

The outlet conduit 44 includes a transverse opening 70. Mounted in conjunction with the transverse opening 70 is an outlet elbow 72. The outlet elbow 72 can be pivoted in the direction as depicted by line 74 to vary the direction of the discharge of the water from the outlet elbow 72 between the dotted line position and the solid line position shown in FIG. 2. In essence, the direction of flow from the outlet elbow 72 can be varied one hundred eighty degrees. Also, the outlet conduit 44 can be adjusted three hundred sixty degrees as indicated by line 76 relative to the housing 30. These two degrees of adjustment are so that the outlet from the outlet elbow 72 can be directed to a portion of the swimming pool 10 that possibly contains a low content of chlorine. The flow from the outlet elbow 72 is in the direction of arrow 78. The direction of flow of the water through the outlet conduit 26 is in the direction of arrow 80.

Fixedly mounted on the exterior surface of suction cup 62 is a protruding tab 82. A similar protruding tab 84 is mounted on the exterior surface of the suction cup 64. Connecting with the protruding tabs 82 and 84 is a lanyard 86. The outer end of the lanyard 86 is connected to a float ring 88. The float ring 88 is to float on the surface 22 of the water 20. The purpose of the float ring 88 is to facilitate manual grasping of the ring 88 by giving it a yank will cause the suction cups 62 and 64 to be disengaged from the wall surface 14 of the swimming pool 10. This will permit the chlorinator 24 to be removed from the swimming pool 10 when such is desired.

Some of the features of the chlorinator of the present invention are that (1) It is less in cost; (2) A user can install as many chlorinators 24 as there are water inlet conduits 28 within the swimming pool 10; (3) The user can direct the water that is being discharged from the chlorinator 24 to any desired location within the swimming pool 10; (4) The chlorinator 24 installs without any modification of existing pool equipment; (5) The chlorinator 24 installs in a matter of seconds; and (6) The amount of chlorine that is being dissolved within the water can be varied through the use of the valve assembly by manually turning of handle 52.

The present invention may be embodied in other specific forms without departing from the essential attributes thereof. Reference should be made to the appending claims rather than the foregoing specification as indicating the scope of the invention.

What is claimed is:

1. A pool chlorinator connectable to a water inlet conduit of a swimming pool comprising:

a housing having a bottom and a top with a sidewall interconnecting said bottom and said top, said housing having an internal chamber, directly adjacent said bottom there is adapted to be located and be confined within said internal chamber a chlorine tablet;

a supply conduit connecting with said housing, said supply conduit adapted to supply water into said internal chamber;

an outlet conduit connecting with said housing, said outlet conduit adapted to conduct water from said internal chamber exteriorly of said housing;

a suction cup attached to said housing, said suction cup to be used to mount said housing onto a wall surface of a swimming pool; and said supply conduit terminating in a flexible connector, said flexible connector to be located about the water inlet conduit and pressed tightly against the wall surface of the swimming pool assuming a deflected position when said housing is mounted against the wall surface of the swimming pool so water from the water inlet conduit is to be conducted into said supply conduit.

2. The pool chlorinator as defined in claim 1 wherein:

said bottom including a series of protrusions, said protrusions being located within said internal chamber, said protrusions adapted to support a chlorine tablet.

3. The pool chlorinator as defined in claim 1 wherein:

said supply conduit located directly adjacent said top, said outlet conduit located directly adjacent said top.

4. The pool chlorinator as defined in claim 1 wherein:

said outlet conduit being adjustable relative to said housing so as to vary the direction of the water flowing from said outlet conduit into the swimming pool.

5. The pool chlorinator as defined in claim 1 including:

a valve assembly mounted in conjunction with said top, manual turning of said valve assembly can vary the flow of the water through said outlet conduit from a minimum to a maximum.

* * * * *